(12) United States Patent
Wakui et al.

(10) Patent No.: US 9,507,072 B2
(45) Date of Patent: Nov. 29, 2016

(54) LIGHT GUIDE, MANUFACTURING METHOD OF LIGHT GUIDE, OPTICAL SHUTTER, AND PLANAR LIGHT-SOURCE DEVICE

(71) Applicant: MITSUBISHI RAYON CO., LTD., Tokyo (JP)

(72) Inventors: Yasuo Wakui, Kanagawa (JP); Tomonari Yoshimura, Kanagawa (JP); Kenji Yagi, Kanagawa (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 14/437,499

(22) PCT Filed: Oct. 23, 2013

(86) PCT No.: PCT/JP2013/078649
§ 371 (c)(1),
(2) Date: Apr. 21, 2015

(87) PCT Pub. No.: WO2014/065304
PCT Pub. Date: May 1, 2014

(65) Prior Publication Data
US 2015/0301262 A1 Oct. 22, 2015

(30) Foreign Application Priority Data
Oct. 26, 2012 (JP) ................. 2012-236360

(51) Int. Cl.
*F21V 7/04* (2006.01)
*F21V 8/00* (2006.01)

(52) U.S. Cl.
CPC ........... *G02B 6/0036* (2013.01); *G02B 6/0063* (2013.01); *G02B 6/0065* (2013.01); *G02B 6/0043* (2013.01)

(58) Field of Classification Search
CPC G02B 6/0036; G02B 6/0063; G02B 6/0065; G02B 6/0043; G02B 6/0038
USPC .................. 362/607, 617, 619, 620
See application file for complete search history.

(56) References Cited

U.S. PATENT DOCUMENTS

| 5,613,751 A * | 3/1997 | Parker ................. G02B 6/0018 362/23.16 |
| 6,500,603 B1 * | 12/2002 | Shioda ................. G02B 6/138 264/1.24 |

(Continued)

FOREIGN PATENT DOCUMENTS

| JP | 2003-149410 | 5/2003 |
| JP | 2004-046076 | 2/2004 |

(Continued)

OTHER PUBLICATIONS

"International Search Report (Form PCT/ISA/210)", mailed on Dec. 10, 2013, with English translation thereof, pp. 1-4, in which eight of the listed references (JP2011-527818A, JP2012-079474A, JP2004-046076A, JP2007-059164A, JP2010-262742A, JP2008-112611A, JP2010-085425A, and JP2009-300989A) were cited.

*Primary Examiner* — Anh Mai
*Assistant Examiner* — Glenn Zimmerman
(74) *Attorney, Agent, or Firm* — Jianq Chyun IP Office

(57) ABSTRACT

Provided is a plate-type light guide (4) in which two opposing main surfaces are set as light emitting surfaces (6A, 6B) and at least one side-edge surface is set as a light incidence surface (5). In such a light guide, a light emitting mechanism (6) is provided in at least one region of at least one main surface; the haze value is 3% or lower in the region where the light emitting mechanism is provided; when a perfect diffuse light enters through at least one light incidence surface (5), a maximum emission angle (θA, θB), at which maximizes the intensity of emitted light (8) from the main surface is in a range from −60 degrees to +60 degrees with respect to a normal line to the main surface; and the utilization efficiency of emitted light is 15% or greater.

5 Claims, 12 Drawing Sheets

(56) References Cited

U.S. PATENT DOCUMENTS

| | | | | |
|---|---|---|---|---|
| 2004/0076396 A1* | 4/2004 | Suga | G02B 6/0036 | 385/146 |
| 2005/0041410 A1* | 2/2005 | Yamashita | G02B 5/30 | 362/620 |
| 2012/0008338 A1* | 1/2012 | Ono | G02B 6/0041 | 362/606 |
| 2012/0307521 A1* | 12/2012 | Chen | G06F 3/0418 | 362/606 |
| 2013/0223099 A1* | 8/2013 | Wang He | G02B 6/0061 | 362/611 |
| 2013/0301295 A1* | 11/2013 | Iwasaki | F21V 7/00 | 362/609 |
| 2014/0022813 A1* | 1/2014 | Krijn | G02B 6/0043 | 362/606 |
| 2014/0104871 A1* | 4/2014 | Boyd | G02B 6/0053 | 362/606 |

FOREIGN PATENT DOCUMENTS

| | | | | |
|---|---|---|---|---|
| JP | 2007-059164 | 3/2007 | | |
| JP | 2008-112611 | 5/2008 | | |
| JP | 2009-300989 | 12/2009 | | |
| JP | 2010-085425 | 4/2010 | | |
| JP | 2010-103068 | 5/2010 | | |
| JP | 2010-262742 | 11/2010 | | |
| JP | 2011-527818 | 11/2011 | | |
| JP | 2012-079474 | 4/2012 | | |
| WO | WO 2011067719 A1 * | 6/2011 | | G02B 6/0043 |
| WO | WO 2012101940 A1 * | 8/2012 | | F21V 7/00 |

* cited by examiner

LIGHT GUIDE, MANUFACTURING METHOD OF LIGHT GUIDE, OPTICAL SHUTTER, AND PLANAR LIGHT-SOURCE DEVICE

CROSS-REFERENCE TO THE RELATED APPLICATION

This application is a 371 application of an international PCT application Ser. No. PCT/JP2013/078649, filed on Oct. 23, 2013, which claims the priority benefit of Japan Patent Application No. 2012-236360, filed on Oct. 26, 2012. The entirety of each of the above-mentioned patent applications is hereby incorporated by reference herein and made a part of this specification.

FIELD OF THE INVENTION

The present invention relates to a light guide, a method for manufacturing the light guide, an optical shutter, and a planar light-source device.

BACKGROUND ART

Because of excellent transparency properties, transparent plates such as reinforced glass plates and methacrylic resin plates are used as light guides of optical shutters, and planar light-source devices such as backlights and lighting appliances, for example.

As light guides for the optical shutters, patent publication 1 describes reinforced glass plates, methacrylic resin plates and the like, and their surfaces are treated to be roughened, for example, to be frosted surfaces. Such optical shutters use light guides with their shutter regions entirely roughened. At the end surface of the light guide, an LED (light emitting diode) light source is placed. The optical shutter enables the back side to be visible from the front side when the LED light source is off, but invisible when the LED light is on, because the light diffused at the roughened surface is emitted from the main surface of the light guide. Namely, the optical shutter is open when the light source is off, but closed when the light source is on.

Also, as a light guide in an edge-lit backlight, patent publication 2 describes a methacrylic resin plate with recesses formed on its surface. The light guide used here has recesses each having a diameter of roughly 260 to 450 μm formed by a laser, and is suitable for a planar light source in a liquid crystal display device.

PRIOR ART PUBLICATION

Patent Publication

Patent publication 1: JP2003-149410A
Patent publication 2: JP2010-103068A

SUMMARY OF THE INVENTION

Problems to be Solved by the Invention

The entire shutter region of the light guide described in patent publication 1 is roughened. Accordingly, when the shutter is open, the back side is visible from the front of the shutter, but the transparency of the shutter is not sufficient. In addition, when the shutter is closed, directions of the emitted light are hard to control because of the roughened surface, and the light intensity is low in the direction of the front side of the shutter, resulting in insufficient concealment capability.

Meanwhile, in consideration of energy consumption, planar light-source devices using LEDs as their light sources have become popular in recent years. Moreover, from a design point of view, planar light-source devices are required to be transparent when the light is off so that the presence of the light guide can be ignored. However, in the light-source device described in patent publication 2, the light guide does not exhibit sufficient transparency when the light source is off, thus failing to provide full response to such a request.

One objective of the present invention is to provide an optical shutter that exhibits excellent transparency when the shutter is open and excellent concealment capability when the shutter is closed, and to provide a light guide to be used in such an optical shutter.

In addition, another objective of the present invention is to provide a planar light-source device with excellent design features capable of exhibiting a high level of transparency when the light source is off, and to provide a light guide to be used in such a planar light-source device.

Solutions to the Problems

The above-described problems are solved by the embodiments [1] to [6] of the present invention. Namely, the objectives mentioned above are achieved by any of [1] to [6] below.

[1] A plate-type light guide in which two opposing main surfaces are set as light emitting surfaces and at least one side-edge surface is set as a light incidence surface. In such a light guide, a light emitting mechanism is provided in at least one region of at least one main surface; the haze value is 3% or lower in the region where the light emitting mechanism is provided; when a perfect diffuse light enters through at least one light incidence surface, a maximum emission angle, at which maximizes the intensity of emitted light, from a region of the main surface with the light emitting mechanism (hereinafter referred to as the "maximum emission angle"), is in a range from −60 degrees to +60 degrees with respect to a normal line to the main surface; and the utilization efficiency of emitted light is 15% or greater.

[2] The light guide described in [1] above, in which when a perfect diffuse light enters through at least one light incidence surface, the maximum emission angle from a region of one main surface with the light emission mechanism is in a range from −30 degrees to +30 degrees with respect to a normal line to the main surface with the light emission mechanism, while the maximum emission angle from a region of the other main surface is in a range of −60 degrees to −30 degrees, in a range of +30 degrees to +60 degrees, or in both of a range of −60 degrees to −30 degrees and a range of +30 degrees to +60 degrees.

[3] A plate-type light guide in which two opposing main surfaces are set as light emitting surfaces, and at least one side-edge surface is set as a light incidence surface. In such the light guide, in at least part of the region on at least one main surface, microscopic recesses or protrusions are formed as a light emitting mechanism; the depth of the recess or the height of the protrusion is at least 30 μm but no greater than 70 μm; the diameter of the recess or the protrusion is at least 40 μm but no greater than 150 μm; and the surface density of recesses or protrusions per 1 square inch is at least 450 dots but no more than 5,000 dots. Here, "dot" is the unit for counting numbers, and 1 dot means one recess or one protrusion.

[4] A method for manufacturing the light guide described in any of [1] to [3] above, in which the light emitting mechanism is formed by irradiating laser beams on at least part of the region of at least one main surface of a light guide material.

[5] An optical shutter, in which a light source is placed to face the light incidence surface in the light guide described in any of [1] to [3] above.

[6] A planar light-source device, in which a light source is placed facing the light incidence surface of the light guide described in any of [1] to [3] above.

Effects of the Invention

Using the light guide according to an embodiment of the present invention, an optical shutter is obtained, which is highly transparent when the shutter is open and exhibits excellent concealment capability when the shutter is closed.

In addition, using the light guide according to an embodiment of the present invention, a planar light-source device with excellent design features is obtained to exhibit excellent transparency when the light source is off.

DETAILED DESCRIPTION OF THE EMBODIMENT

<Light Emitting Surface>

The light emitting surface is formed with each of two opposing main surfaces in the light guide related to the present invention.

In the present application, two "opposing" surfaces of the light guide mean that they are placed opposite each other to face inward in the light guide.

<Light Incidence Surface>

The light incidence surface is formed with at least the side-edge surface of the light guide related to the present invention.

One side-edge surface may be set as the light incidence surface, or any of multiple side-edge surfaces may each be set as the light incidence surface.

Figure 7:
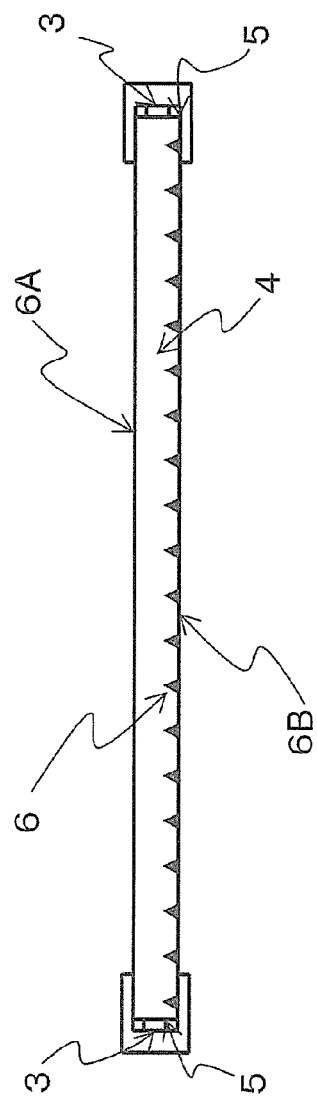
FIG. 7: a side view schematically showing an embodiment of the optical shutter or planar light-source device using the light guide related to the present invention.

When there are two light incidence surfaces, two opposing side-edge surfaces may each be set as the light incidence surface, or two side-edge surfaces perpendicular to each other may each be the light incidence surface. Considering the uniformity of light emitted from the light emitting surface, each of two opposing side-edge surfaces is preferred to be the light incidence surface as shown in FIG. 7, for example.

<Light Emitting Mechanism>

The light emitting mechanism is for emitting the light that has entered the light guide related to the present invention toward the outer side of the light guide.

Such the light emitting mechanism is formed in at least part of the region of at least one main surface of the light guide related to the present invention.

It is sufficient if the light emitting mechanism is formed on at least one of two main surfaces of the light guide. It is also an option for the light emitting mechanism to be formed on both main surfaces.

It is sufficient if the light emitting mechanism is formed in at least part of the main surface. It is also an option for the light emitting mechanism to be formed on the entire region of the main surface. In addition, the light emitting mechanism may be formed by being divided into multiple regions of the main surface.

Examples of methods of the light emitting mechanism are to form microscopic recesses or protrusions on the main surface, and to form a resin layer, in which a light scattering substance such as titanium-oxide particles is dispersed in a resin such as an acrylic binder resin, on the main surface. Among those, from the viewpoint of efficiently using emitted light, it is preferred to form microscopic recesses or protrusions on the main surface.

When microscopic recesses or protrusions are formed on the main surface to work as the light emitting mechanism, the depth of the recess or the height of the protrusion is preferred to be 30 μm or greater but 70 μm or less. The depths or heights of multiple recesses or protrusions may vary as long as they are within a range of 30 μm to 70 μm.

The depth of the recess or the height of the protrusion means the distance in a cross-sectional view from the bottommost portion of the recess or the topmost portion of the protrusion to the main surface (here, a flat portion excluding the concave or convex formations). An example of the recess is described below with reference to FIG. 1.

Figure 1:
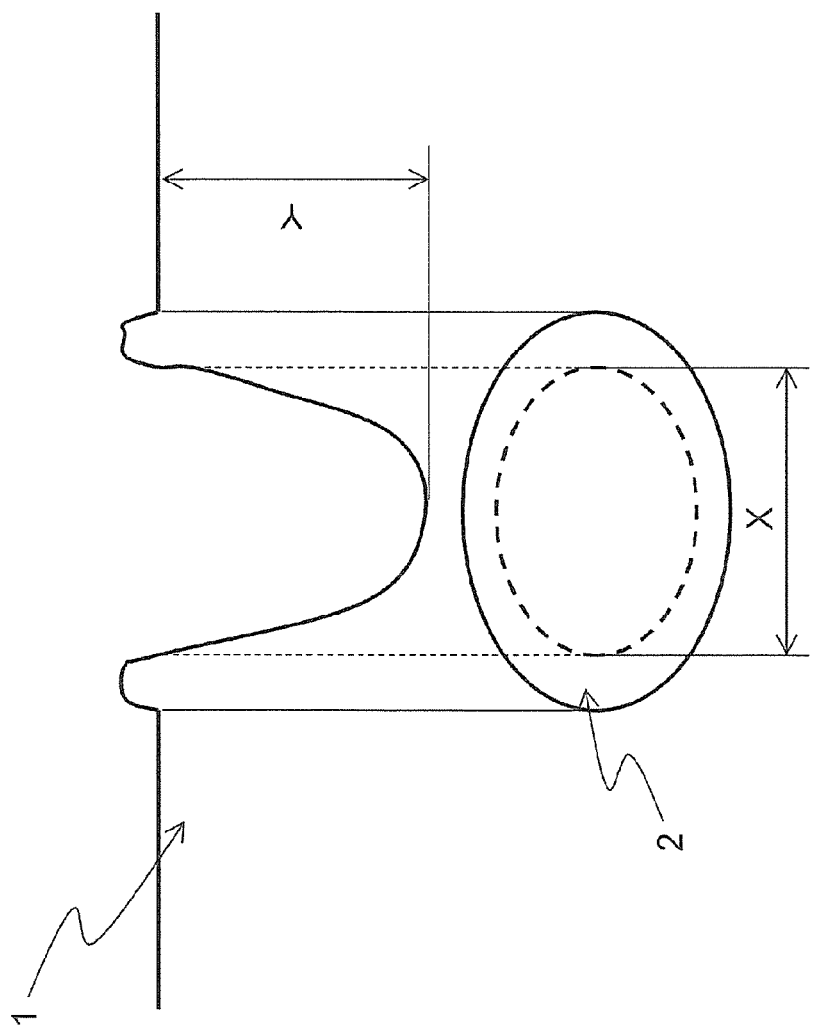
FIG. 1: a cross-sectional view of the recess and a plan view of the recess in the light emitting mechanism of the light guide according to an embodiment of the present invention.

FIG. 1 shows cross section 1 of the recess and plan view of the recess 2 in the light emitting mechanism of the light guide according to an embodiment of the present invention. The depth of the recess is distance (Y) measured from the bottommost portion in cross section 1 of the recess to the main surface.

When the depth of the recess or the height of the protrusion is 30 µm or greater, the maximum emission angle is more likely to be set at +60 degrees or less with respect to a normal line to the main surface that has the light emitting mechanism. Also, in such a setting, the maximum emission angle is more likely to be set at +30 degrees or less with respect to a normal line to the main surface that does not have the light emitting mechanism.

When the depth of the recess or the height of the protrusion is 70 µm or less, the maximum emission angle is more likely to be set at −30 degrees or greater with respect to a normal line to the main surface without the light emitting mechanism.

The lower limit of a range that sets the depth of recesses or the height of protrusions is more preferred to be 35 µm and especially preferred to be 40 µm.

The upper limit of a range that sets the depth of recesses or the height of protrusions is more preferred to be 65 µm.

When microscopic recesses or protrusions are formed on the main surface to work as the light emitting mechanism, the diameter of the recess or the protrusion is preferred to be 40 µm or greater but 150 µm or less. The diameter of multiple recesses or protrusions may vary as long as they are within a range of 40 µm to 150 µm.

The diameter of the recess or the protrusion indicates the maximum inner diameter of the recess or protrusion. In the following, an example of the recess is described by referring to plan view of the recess 2 shown in FIG. 1.

The diameter of the recess is maximum inner diameter (X) as shown with a dotted line inside the recess 2 in plan view.

When the diameter of the recess or the protrusion is set at 40 µm or greater, the utilization efficiency of emitted light of the light guide related to the present invention is likely to be 15% or greater.

The utilization efficiency of emitted light indicates a ratio of the sum of emitting light fluxes from the light emitting surface with the light emitting mechanism and emitting light fluxes from the light emitting surface without the light emitting mechanism to incident light fluxes that have entered through the light incidence surface.

When the diameter of the recess or the protrusion is 150 µm or less, the haze value of the light guide related to the present invention is more likely to be 3% or lower.

The lower limit of a range that sets the diameter of recesses or protrusions is more preferred to be 50 µm and especially preferred to be 60 µm.

The upper limit of a range that sets the diameter of recesses or protrusions is more preferred to be 130 µm and especially preferred to be 110 µm.

The surface density of recesses or protrusions per 1 square inch is preferred to be at least 450 dots but no more than 5,000 dots.

When the surface density of recesses or protrusions per 1 square inch is 450 dots or more, the utilization efficiency of emitted light of the light guide related to the present invention is more likely to be 15% or greater.

When the surface density of recesses or protrusions per 1 square inch is 5,000 dots or less, the haze value of the light guide related to the present invention is more likely to be 3% or lower.

The lower limit of a range that sets the surface density of recesses or protrusions is more preferred to be 500 dots and especially preferred to be 600 dots per square inch.

The upper limit of a range that sets the surface density of recesses or protrusions is more preferred to be 4,000 dots and especially preferred to be 2,800 dots per square inch.

<Light Guide>

The light guide related to the present invention is in a plate shape and has two opposing main surfaces, each of which is the light emitting surface, and has the side-edge surfaces, at least one of which is the light incidence surface.

Figure 12:
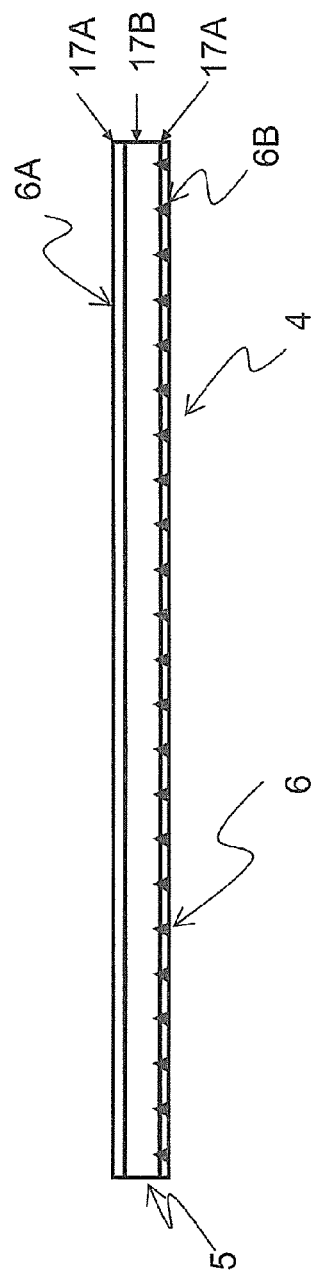
FIG. 12: a side view schematically showing an example of the light guide of the present invention.

As shown in FIG. 12, for example, the light guide according to an embodiment of the present invention may be formed as a multilayer plate, depending on requirements. Light guide 4 in FIG. 12 is triple-layered with resin layer 17A with a low refractive index, resin layer 17B with a high refractive-index and resin layer 17A with a low refractive index. By employing such a structure, even when the surface of light guide 4 is covered with dust or smudged with fingerprints, the dust or fingerprints are hardly noticeable.

FIG. 12 shows light incidence surface 5, light emitting surface 6A without the light emitting mechanism, and light emitting surface 6B with the light emitting mechanism 6.

The light guide according to an embodiment of the present invention may be set as a curved plate shape if necessary.

The thickness of the light guide related to the present invention may be 0.5 to 6 mm, for example.

The size of the light guide related to the present invention is not limited specifically and may be selected freely according to its usage purpose.

Examples of the shape of the light guide related to the present invention are a square, rectangle, polygon with five or more angles, and a circle.

In the light guide related to the present invention, two opposing main surfaces are each set to be the light emitting surface.

The light emitting mechanism is provided in at least part of the light emitting surface. The light entered through the light incidence surface will be emitted from the light emitting surface through the light emitting mechanism.

The haze value of the light guide related to the present invention is preferred to be 3% or lower.

When the light guide related to the present invention is used in an optical shutter, by setting the haze value of the light guide at 3% or lower, excellent visibility of the back side is more likely to be achieved when the shutter is open. Also, when the light guide related to the present invention is used as a planar light-source device in a lighting appliance, by setting the haze value of the light guide at 3% or lower, the planar light-source device is likely to have excellent design features with a high level of transparency when the light source is off.

The haze value of the light guide related to the present invention is preferred to be 2.5% or lower, more preferably 2% or lower. The haze value of the light guide related to the present invention is usually 0.1% or higher.

When a perfect diffuse light enters through at least one light incidence surface into the light guide related to the present invention, the maximum emission angle is preferred to be −60 degrees or greater but +60 degrees or less with respect to a normal line to the main surface (namely, the direction along a normal line to the main surface is set at 0 degrees).

The perfect diffuse light indicates a light with a Lambertian distribution (a radiance distribution that is uniform in all directions), for example, light emitted from an LED light source that has no condenser lens.

The maximum emission angle is described below by referring to FIGS. 2 and 3.

Figure 2:
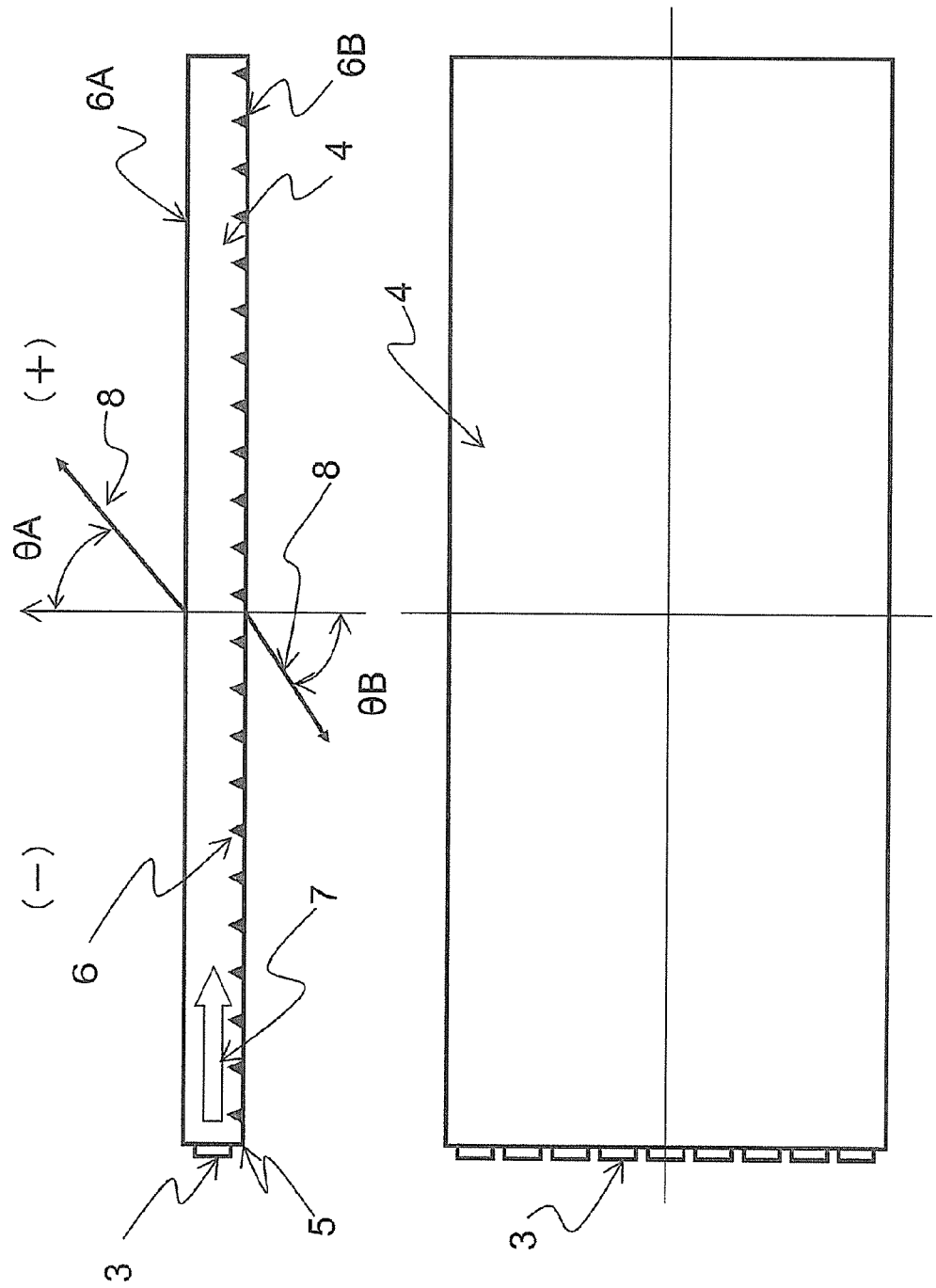
FIG. 2: a side view and a plan view schematically showing how light is emitted from the main surfaces when light enters through the side-edge surface of the light guide according to an embodiment of the present invention.

FIG. 2 is a schematic view of a side surface, along with a schematic plan view, illustrating how the light emits from main surfaces when a light enters through the side-edge surface of the light guide according to an embodiment of the present invention.

Light 7 emitted from LED light source 3 placed to face light incidence surface 5 enters light guide 4 through light incidence surface 5, propagates while repeating internal reflections at light emitting surface 6A with the light emitting mechanism and at light emitting surface 6B without the light emitting mechanism, and is emitted by the light emitting mechanism as emitting light 8 from light emitting surfaces (6A, 6B).

Figure 3:
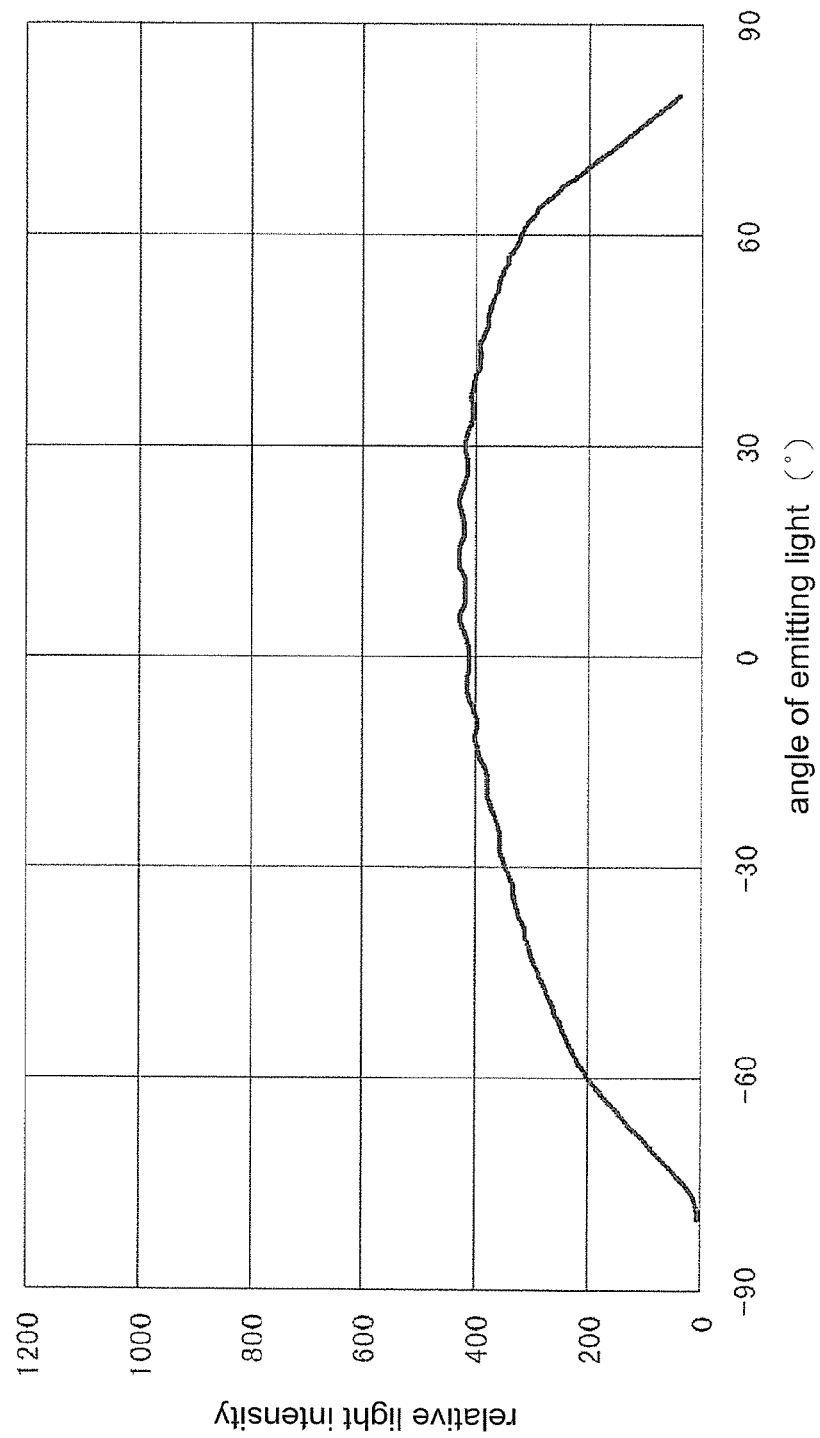
FIG. 3: a graph showing light emitting pattern (a) from the main surface of the light guide according to an embodiment of the present invention.

The maximum emission angle means the angle of emitting light at which the light intensity is maximized as shown in FIG. 3, which is an angle made by the direction of light emitted from light emitting surface 6A or 6B and a normal line to the main surface θA or θB as shown in FIG. 2. When the direction of a normal line to the main surface is set at zero degrees, the side closer to the light source from the normal line is denoted as negative (−) and the side opposite the light source is denoted as positive (+).

When the maximum emission angle is −60 degrees or greater but +60 degrees or less with respect to a normal line to the main surface, excellent concealment capability is likely to be achieved when the shutter is closed.

Patterns of emitting light that make the maximum emission angle of −60 degrees or greater but +60 degrees or less are those shown in FIGS. 3 to 6, for example.

The pattern of emitting light shown in FIG. 3 (pattern (a) of emitting light) is an example of the pattern of light that emits from the main surface without the light emitting mechanism, in a structure where the light emitting mechanism is provided for one main surface, and only one side-edge surface is set as the light incidence surface. In such an example, the maximum emission angle is observed to be near +10 degrees. Here, when two opposing side-edge surfaces are each set as the light incidence surface, approximately the same pattern is observed, and the maximum emission angle is observed near a normal line, for example, in a range from −15 degrees to +15 degrees, and especially from −10 degrees to +10 degrees.

Figure 4:
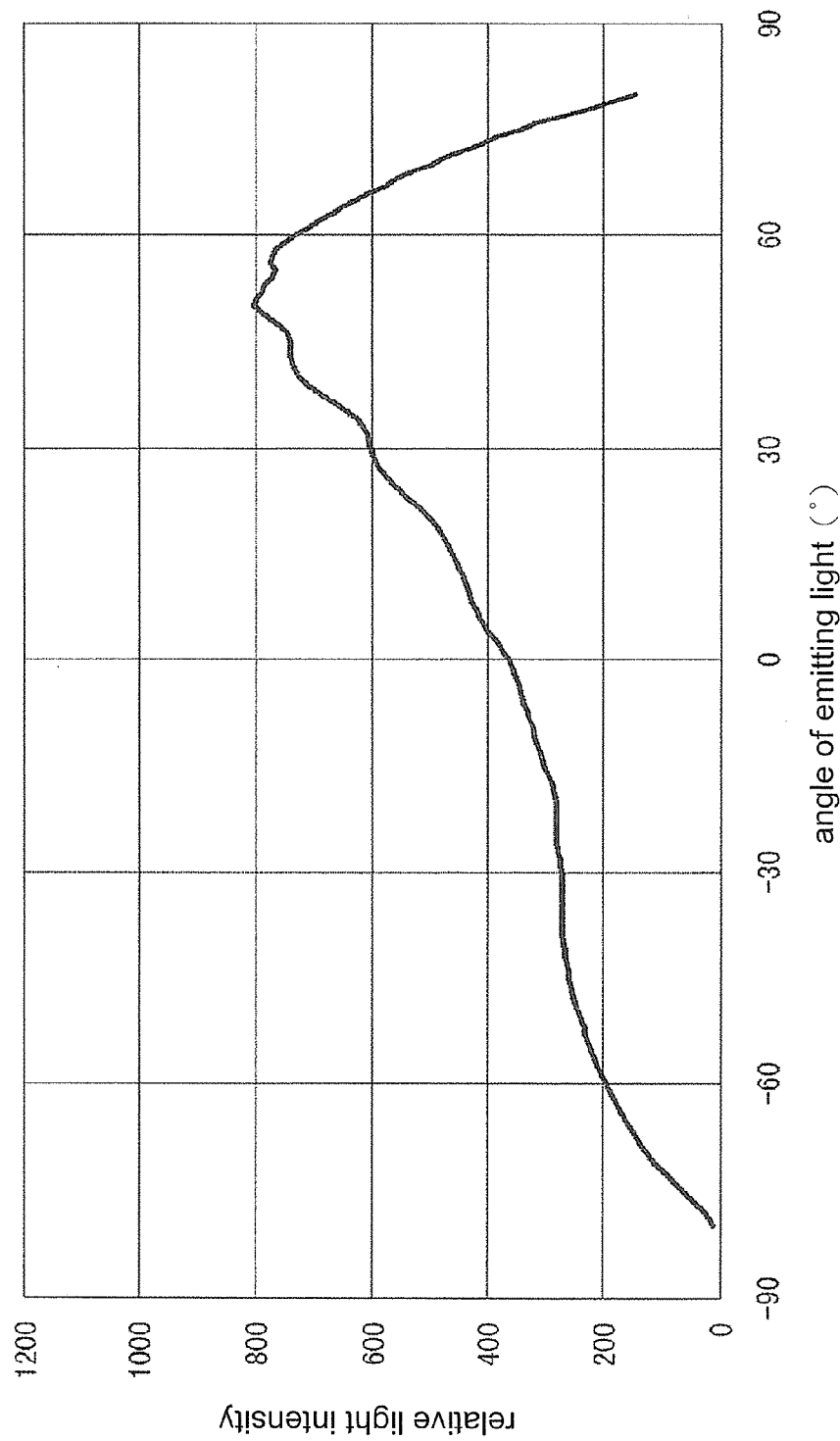
FIG. 4: a graph showing light emitting pattern (b) from the main surface of the light guide according to another embodiment of the present invention.

The pattern of emitting light shown in FIG. 4 (pattern (b) of emitting light) is an example of the pattern of light that emits from the main surface with the light emitting mechanism, in a structure where the light emitting mechanism is provided for one main surface, and only one side-edge surface is set as the light incidence surface. In such an example, the maximum emission angle is observed near +50 degrees.

Figure 5:
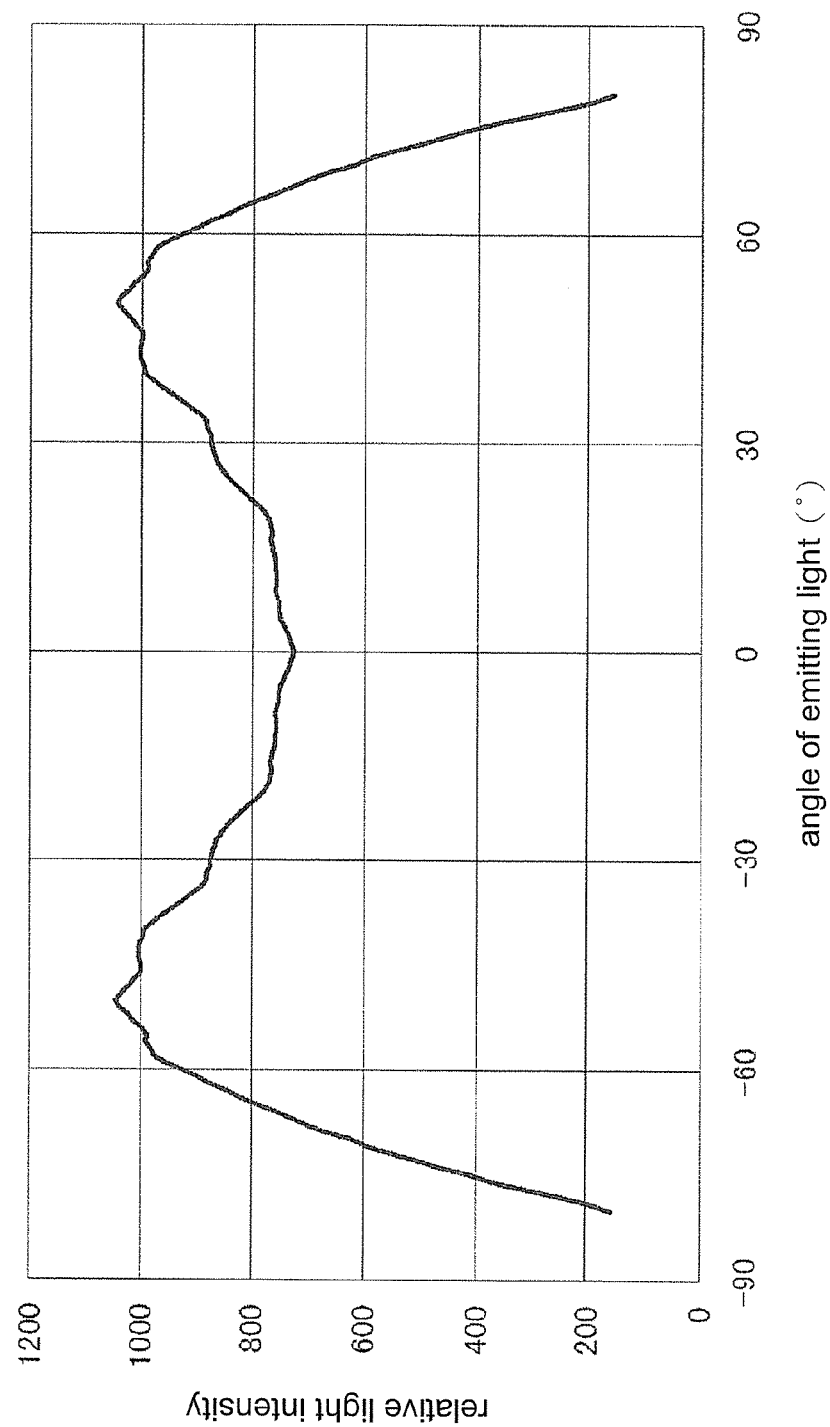
FIG. 5: a graph showing light emitting pattern (c) from the main surface of the light guide according to yet another embodiment of the present invention.

The pattern of emitting light shown in FIG. 5 (pattern (c) of emitting light) is an example of the pattern of light that emits from the main surface with the light emitting mechanism, in a structure where the light emitting mechanism is provided for one main surface, and two opposing side-edge surfaces are each set as the light incidence surface. In such an example, the maximum emission angle is observed near −50 degrees as well as near +50 degrees.

Figure 6:
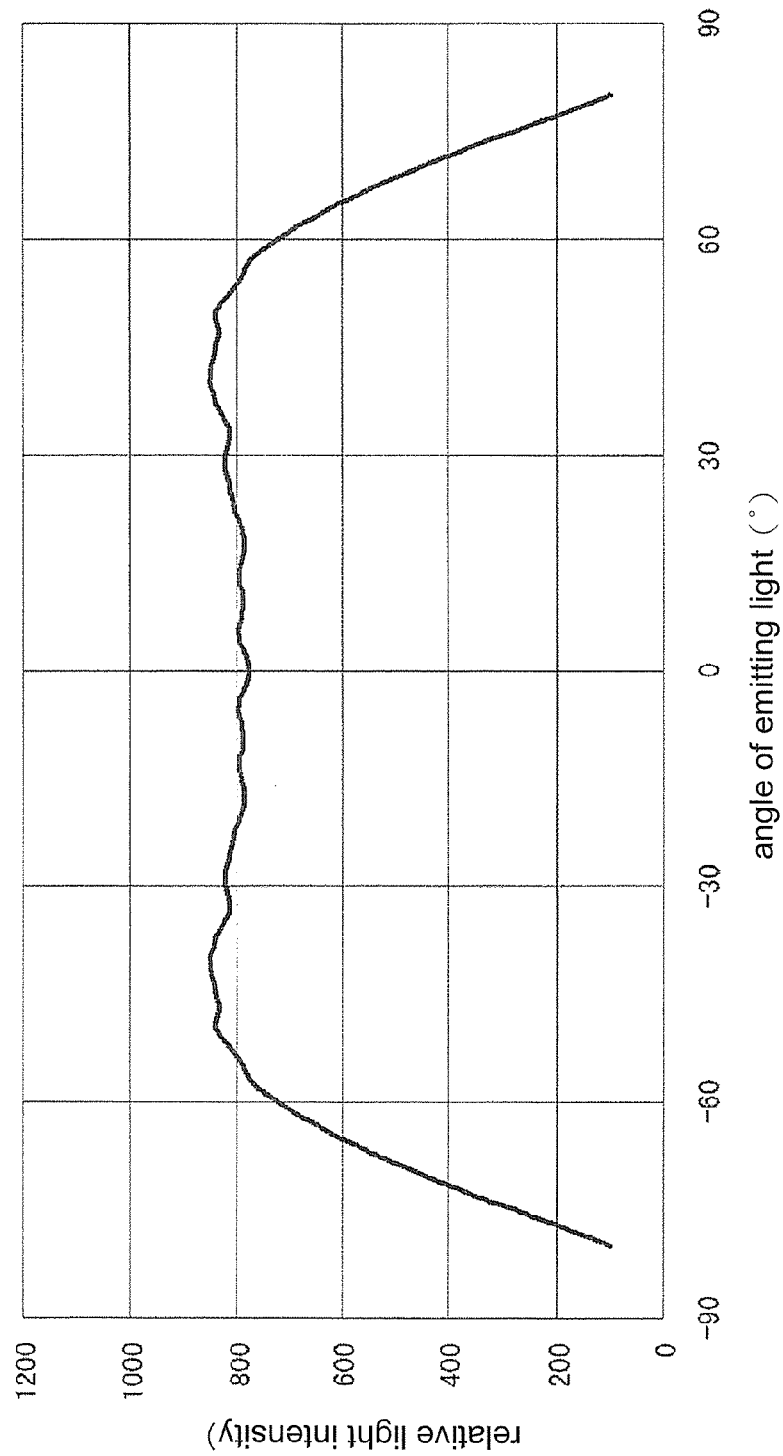
FIG. 6: a graph showing light emitting pattern (d) from the main surface of the light guide according to yet another embodiment of the present invention.

The pattern of emitting light shown in FIG. 6 (pattern (d) of emitting light) is an example of the pattern of light that emits from the main surface in a structure where the light emitting mechanism is provided for each of two main surfaces, and two opposing side-edge surfaces are each set as the light incidence surface. In such an example, the maximum emission angle is observed in a range from −50 degrees to +50 degrees.

According to the present invention, when a light source is on, the emitting light is efficiently emitted to the front side of the light emitting surface, whereas the back side is hardly visible as described in light emitting patterns shown in FIGS. 3 to 6. As a result, an excellent shutter function, namely, a high level of concealment capability, is achieved.

As the optical shutter, it is preferred to use the light guide that has light emitting pattern (a) from one main surface and light emitting pattern (c) from the other main surface, or the light guide that has light emitting pattern (d) from both of its main surfaces.

As the planar light-source device, especially as a pendant lighting appliance, it is preferred to use the light guide that has light emitting pattern (a) from one main surface and light emitting pattern (c) from the other main surface.

The light guide related to the present invention is preferred to have the utilization efficiency of emitted light at 15% or higher.

When the utilization efficiency of emitted light is 15% or higher, excellent concealment capability is achieved when the shutter is closed. Examples of the material for the light guide related to the present invention are transparent inorganic materials such as glass and transparent resin materials.

Examples of transparent resins to be used for transparent resin materials are methacrylic resins, styrenic resins, polycarbonate resins and alicyclic polyolefin resins. Among those, methacrylic resins are preferred due to ease of laser processing.

Examples of methacrylic resins are homopolymers or copolymers of methacrylic acid esters.

Examples of methacrylic acid esters are methyl methacrylate, ethyl methacrylate, propyl methacrylate and cyclohexyl methacrylate.

It is an option to copolymerize a methacrylic acid ester with acrylic acid esters such as methyl acrylate, ethyl acrylate and n-butyl acrylate; acrylic acid; methacrylic acid; α,β-ethylenically unsaturated carboxylic acids such as maleic anhydride; and other vinyl monomers such as aromatic vinyl monomers, for example, styrene, and vinyl cyanide monomers, for example, acrylonitrile.

As for methacrylic resins, a homopolymer of methyl methacrylate and copolymers having methyl methacrylate as a main component are preferred from the viewpoints of ease of processing and lower cost.

In the embodiments of the present invention, a scattering substance may be dispersed in the light guide if necessary.

Examples of the scattering substance are inorganic dispersing agents and organic dispersing agents.

Examples of inorganic dispersing agents are glass fine particles and silica fine particles.

Examples of organic dispersing agents are silicone fine particles and styrenic fine particles.

The light guide related to the present invention is manufactured by forming the light emitting mechanism on the main surface of a plate-shaped light guide material (blank light guide).

Methods for forming recesses as the light emitting mechanism are, for example, laser processing and mechanical processing using a blade.

Methods for forming protrusions as the light emitting mechanism are, for example, hot pressing, injection molding, screen printing and ink-jet printing.

When printing methods such as screen printing and ink-jet printing are used for forming protrusions as the light emitting mechanism, the scattering substance may be mixed into the ink to be used for forming protrusions.

To form the light emitting mechanism on the main surface of the light guide material, a method for forming recesses by laser processing is preferred from the viewpoints of ease of processing and mass production.

A method for forming recesses by using a laser is, for example, irradiating laser beams on the main surface of the light guide material.

The laser is preferred to be such a type that shows excellent efficiency when the light guide material is processed. For example, infrared lasers such as a carbon-dioxide gas ($CO_2$) laser may be used. Especially, when a methacrylic resin sheet is used as the light guide material, the laser with a wave length of 9.3 µm or 10.6 µm, is preferred. When the laser with such a wave length is used, a methacrylic resin sheet absorbs laser beams and is heated, resulting in efficient laser processing.

An example of a $CO_2$ laser processing apparatus is PLS 4.75 (brand name, wave length: 10.6 µm, average output: 40 W), made by Universal Laser Systems, Inc.

The dimensions (diameter, depth) of recesses can be controlled by changing laser irradiation conditions such as output, scanning speed and focal position of the laser, and by changing a numerical aperture of a condenser lens, for example. Since laser beams are irradiated as pulsed light, multiple recesses separated from each other are formed as the laser scans the material.

<Optical Shutter, Planar Light-Source Device>

In the optical shutter or the planar light-source device related to the present invention, a light source is located to face the light incidence surface of the light guide related to the present invention.

Examples of the light source are an LED and cold cathode fluorescent lamp. Of those, an LED is preferred because of its low-consumption electric power and a simplified drive circuit.

As for the LED, a white or colored LED may be used, or different colors may be combined, depending on usage purposes. In addition, an LED without a lens (LED to emit perfect diffuse light) may be used, or an LED with a lens may also be used unless it emits parallel beams.

In the embodiments of the present invention, the above listed LEDs may be used in a combination according to usage purposes.

When the optical shutter or the planar light-source device related to the present invention uses the LED light source, one or more LED light sources may be positioned to face the side-edge surface.

It is sufficient to set at least one light incidence surface for a light source to be used in the optical shutter or the planar light-source device related to the present invention. When setting two light incidence surfaces, two opposing side-edge surfaces are preferred to be set for that purpose.

The light guide to be used in the optical shutter or the planar light-source device related to the present invention may have the light emitting mechanism only on one main surface or on each of both main surfaces.

By referring to FIG. 7, an optical shutter or a planar light-source device is described. In the structure, the light guide is used where recesses are formed as the light emitting mechanism on one main surface, and two opposing side-edge surfaces are each set as the light incidence surface.

FIG. 7 is a schematic side view of the optical shutter or the planar light-source device that uses light guide 4, in which two opposing side-edge surfaces are each set as light incidence surface 5, and recesses are formed on one main surface as light emitting mechanism 6.

The light emitted from light source 3 enters light guide 4 through light incidence surface 5 and is emitted from light emitting surface 6A without the light emitting mechanism and from light emitting surface 6B with light emitting mechanism 6. At that time, since the light emitted from light emitting surface 6A without the light emitting mechanism is the light reflected at light emitting mechanism 6, the light emitting pattern is pattern (a) described above.

On the other hand, the light emitted from light emitting surface 6B with the light emitting mechanism is the light refracted at light emitting mechanism 6. Thus, the light emitting pattern is aforementioned pattern (c).

Figure 8:
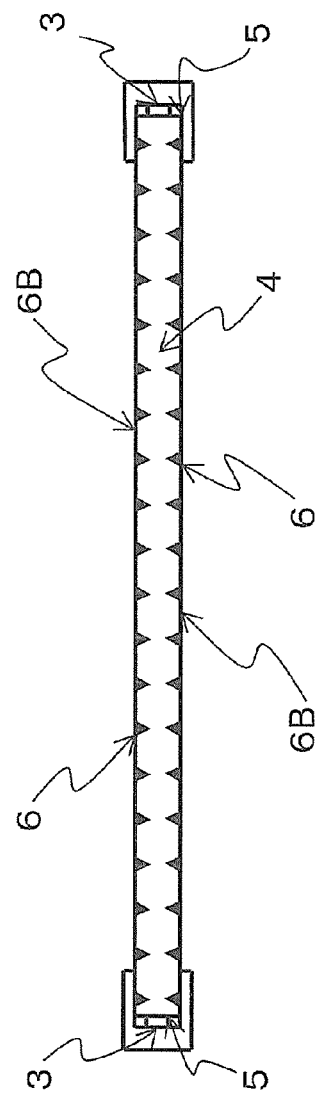
FIG. 8: a side view schematically showing another embodiment of the optical shutter or planar light-source device using the light guide related to the present invention.

By referring to FIG. 8, an optical shutter or a planar light-source device is described. In the structure, the light guide is used where recesses are formed as the light emitting mechanism on both main surfaces, and two opposing side-edge surfaces are each set as the light incidence surface.

The light emitted from light source 3 enters light guide 4 from light incidence surface 5 and is emitted from two opposing light emitting surfaces 6B each having light emitting mechanism 6. At that time, since each of both main surfaces has light emitting mechanism 6, aforementioned light emitting patterns (a) and (c) are mixed, resulting in pattern (d) when the light is emitted from light emitting surface 6B with light emitting mechanism 6.

The optical shutter related to the present invention is open when the light source is off, but the optical shutter is closed when the light source is on.

Since the optical shutter related to the present invention uses the light guide of the present invention, the back side of the shutter is well visible from the front side of the optical shutter when the shutter is open, whereas when the shutter is closed, excellent concealment capability is achieved. In the present invention, excellent concealment capability means a high level of concealment as a shutter to make the back side of the shutter invisible from any direction, that is, a direction from the front or a diagonal direction.

Considering excellent concealment capability, as the optical shutter, it is preferred to use the light guide that has light emitting pattern (a) from one main surface and light emitting pattern (c) from the other main surface, or the light guide that has light emitting pattern (d) from both of its main surfaces.

Since the planar light-source device related to the present invention uses the light guide of the present invention, it exhibits excellent transparency when the light source is off, and thus is used as the lighting appliance with excellent design features.

When the planar light-source device related to the present invention is used in a pendant lighting appliance, it is preferred to use the light source with the main surface that emits light in pattern (c), and to set the main surface to face the ceiling, because such a setting avails itself of indirect light efficiently.

EXAMPLES

The present invention is described by referring to the examples below. In the following, "part" indicates "part by mass."

(1) Evaluation of Light Guide (a) Depth and Diameter of a Recess

The depth and diameter of a recess in a light guide test piece were measured by using a laser microscope (OLS-3500 (brand name), made by Olympus Corporation) as follows.

First, any one recess is selected from the central portion in a test piece of the light guide, 3D image data were obtained by using an objective lens (×50) and by setting a measuring pitch of 0.25 μm in the depth direction of the recess and a laser intensity level of 100.

Next, using a built-in function of the laser microscope for removing noise from irregular shapes, noise reduction was performed once on the obtained 3D image data for removing dark current noise, and then using the built-in function of the laser microscope for step measurement, the depth and diameter of the recess were measured.

The diameter of a recess is maximum inner diameter (X) based on the upper surface of the light guide test piece as shown in FIG. 1. Also, the depth of a recess is distance (Y) from the upper surface of the light guide test piece to the bottommost portion of the recess as shown in FIG. 1.

(b) Surface Density of Recesses

The surface density of recesses in a light guide test piece was determined by using a laser microscope (OLS-3500 (brand name), made by Olympus Corporation) as follows.

First, an objective lens (×10) was selected to obtain 2D image data of a main surface (10.24 mm long×10.24 mm wide) with a light emitting mechanism of a light guide test piece. Then, the numbers of recesses per 1 square inch were obtained to calculate the surface density of the recesses.

(c) Haze Value

Using a haze meter (HM-150 (brand name), made by Murakami Color Research Laboratory Co., Ltd.), a main surface with a light emitting mechanism of a light guide test piece was set to the light receiving side of the haze meter, and the haze value was measured based on JIS K 7136.

(d) Maximum Emission Angle

The maximum emission angle was determined by the method below.

Figure 9:
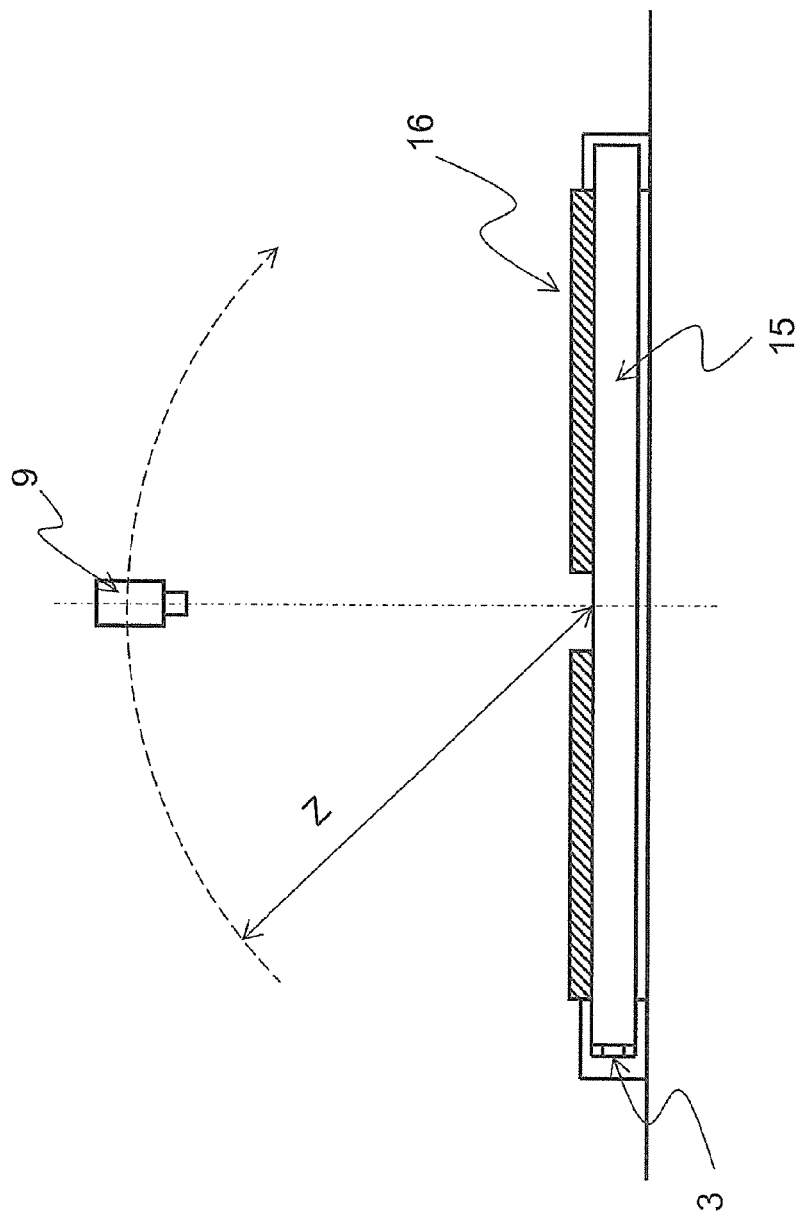
FIG. 9: a view schematically showing an example of a device for measuring the maximum emission angle of the light guide related to the present invention.

As shown in FIG. 9, facing one side-edge surface of optical shutter test piece 15 where a main surface opposite the main surface with a light emitting mechanism was set upward facing luminance meter 9, LED light source 3 (brand name: NS2W123B, made by Nichia Corporation) was installed. Then, light-shielding cover 16 having a circular opening with a diameter of 10 mm formed in the center was placed on the upper main surface to block light. After that, the measuring angle was set at 2 degrees in luminance meter 9 (brand name: BM-7, made by Topcon Corporation), which was set above optical shutter test piece 15. Then, based on the center of the upper main surface of optical shutter test piece 15, luminance meter 9 was moved at 1 degree intervals in a direction shown in FIG. 9 by setting the distance from luminance meter 9 to the center of the upper main surface to be a predetermined value (Z=650 mm). Accordingly, relative light intensities were obtained and the maximum emission angle was determined. Here, by setting light-shielding cover 16 and by increasing the measuring angle (2 degrees) of luminance meter 9, luminance meter 9 functioned as a photometer.

(e) Utilization Efficiency of Emitted Light

The utilization efficiency of emitted light was determined by the method below.

Figure 10:
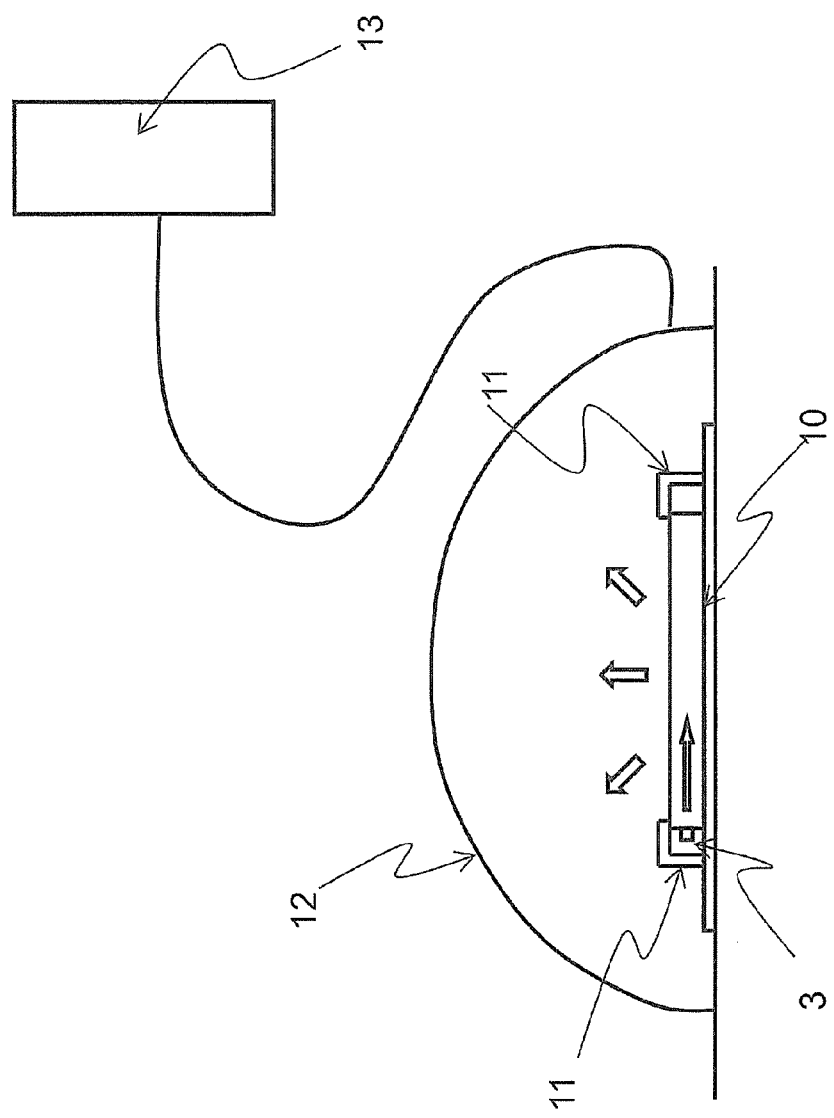
FIG. 10: a view schematically showing an example of a device for measuring the utilization efficiency of emitted light of the light guide related to the present invention.

As shown in FIG. 10, facing one side-edge surface of light guide test piece 10, LED light source 3 (brand name: NS2W123B, made by Nichia Corporation) was installed, and the surfaces excluding the upper surface of the main surface were shielded by light-shielding covers 11. Then, the test piece was accommodated in a HalfMoon integrating sphere 12 (brand name: HM-1030, made by Otsuka Electronics Co., Ltd.) and 60 mA current was applied to LED light source 3 so that a light flux of 13.5 lm was emitted into light guide test piece 10. Here, a main surface with a light emitting mechanism and a main surface without a light emitting mechanism of light guide test piece 10 were each set as an upper surface, light flux (Ia) emitted from the main surface with the light emitting mechanism and light flux (Ib) emitted from the main surface without the light emitting mechanism were respectively measured by using a light flux detector 13 (brand name: MCPD-9800, made by Otsuka Electronics) each connected to HalfMoon integrating sphere 12, and the utilization efficiency of emitted light was determined by the following formula.

Utilization efficiency of emitted light(%)=({emitted light flux(Ia) (lm)+emitted light flux(Ib) (lm)}/incident light flux(13.5 (lm))×100

(2) Evaluation of Optical Shutter (a) Transparency

A document was placed 20 cm toward the rear from the back side of a main surface without a light emitting mechanism in a light guide of an optical shutter. Next, at a position 20 cm toward the front from the main surface with a light emitting mechanism in the light guide of the optical shutter, the visibility of the document was tested when the light source of the optical shutter was off. The transparency of the light guide in the optical shutter was evaluated as follows.

◯: characters on the document are easy to visually recognize; transparency is excellent when the light source is off x: characters on the document are hard to visually recognize; transparency is insufficient when the light source is off (b) Concealment Capability (A) (Concealment Capability when Seen from a Diagonal Direction)

A document was placed 20 cm toward the rear from the back side of a main surface without a light emitting mechanism in the light guide of an optical shutter. Next, at a position 20 cm toward the front from the main surface with a light emitting mechanism in the light guide of the optical shutter, the visibility of the document was tested from a direction diagonally 45 degrees when the light source of the optical shutter was on. The concealment capability of the optical shutter when seen diagonally was evaluated as follows.

◯: characters on the document are hard to visually recognize; concealment capability is excellent x: characters on the document are easy to visually recognize; concealment capability is insufficient (c) Concealment Capability (B) (Concealment Capability when Seen from Front Side)

A document was placed 20 cm toward the rear from the back side of a main surface without a light emitting mechanism in the light guide of an optical shutter. Next, at a position 20 cm toward the front from the main surface with a light emitting mechanism in the light guide of the optical shutter, the visibility of the document was tested from a direction along a normal line to the light emitting surface when the light source of the optical shutter was on. The concealment capability of the optical shutter when seen from a direction along a normal line to the light emitting surface of the optical shutter was evaluated as follows.
◯: characters on the document are hard to visually recognize; concealment capability is excellent
x: characters on the document are easy to visually recognize; concealment capability is insufficient Manufacturing Example 1

Manufacturing Light Guide Material (α)

Into a vessel equipped with a cooling tube, thermometer and stirrer, 98 parts of methyl methacrylate, 2 parts of n-butyl acrylate, 0.063 parts of n-dodecyl mercaptan as an agent to adjust the molecular mass and 0.005 parts of dioctyl sulfosuccinate sodium as a releasing agent were provided.

While the contents in the vessel are being stirred, 0.10 parts of 2,2'-azobis-(2,4-dimethylvaleronitrile) was added as a polymerization initiator and the internal temperature was raised to 90° C. and held there for 10 minutes. Next, the vessel was cooled to room temperature to obtain a syrup with a polymer content of 26 mass %, a mass-average molecular mass of 116,000, and an absolute viscosity of 1.8 Pa·s at 20° C.

To 100 parts of the syrup, 0.35 parts of t-hexyl peroxypivalate (brand name: Perhexyl PV, made by NOF Corporation) and 0.13 parts of n-dodecyl mercaptan as an agent to adjust the molecular mass were added and stirred. Accordingly, a thermally polymerizable viscous liquid was obtained.

The thermally polymerizable viscous liquid was poured into a mold formed by setting two opposing reinforced glass plates to have a space of 2.3 mm using a polyvinyl chloride gasket, polymerized by being immersed in an 80° C. hot water bath for 45 minutes, and then was thermally treated for 60 minutes in a hot-air oven at 135° C. After the thermal treatment, the content in the mold was cooled at room temperature. Accordingly, light guide material (a) with a thickness of 3 mm was obtained when the gasket and the reinforced glass plates were removed.

Manufacturing Example 2

Manufacturing Light Guide Material (β)

A transparent methacrylic resin material for shaping (Acrypet VH6 #001 (brand name), made by Mitsubishi Rayon Co., Ltd.) was melted and kneaded using a single-screw kneading extruder with a 65 mm φ vent, and was extruded from a T die at a resin temperature of 260° C. Then, using a smooth-surface three-roll mill in a combination of lower, middle and upper rollers, and with setting the surface temperatures of the lower, middle and upper rollers at 90° C., 175° C. and 120° C. respectively, the extruded material was press-shaped to obtain 3 mm-thick light guide material (β).

Example 1

Using a panel saw (SZ-111 (brand name), made by Shinx Corporation), a 210 mm×300 mm optical shutter material and a 60 mm×60 mm light guide test piece material were cut out from light guide material (a) prepared in manufacturing example (1).

Next, using a PLA-Finisher (brand name, made by Asahi Techno Co., Ltd.), and with setting the number of rotations of a rotary blade at 90 rpm and processing speed at 2.5 min/minute, all the side-edge surfaces of the optical shutter material and the light guide test piece material were processed to be mirror surfaces.

Then, using a $CO_2$ laser processing apparatus (PLS 4.75 (brand name), made by Universal Laser Systems) with a condenser lens (HPDFO (brand name), made by Universal Laser Systems), and with setting the laser processing conditions as shown in Table 1 (laser power, laser scanning rate, laser scanning pitch and resolution), one each main surface of the optical shutter material and the light guide test piece material was processed to form microscopic recesses so as to form a main surface with a light emitting mechanism. Accordingly, an optical shutter test piece and a light guide test piece were obtained.

The depth of the recess was 46 μm, the diameter of the recess was 72 μm and the surface density of recesses was 645 dots/square inch. The results are shown in Table 2.

The haze value of the light guide test piece was 1.3%, the maximum emission angle was 12 degrees, and the utilization efficiency of emitted light was 32%. The results are shown in Table 3.

Figure 11:
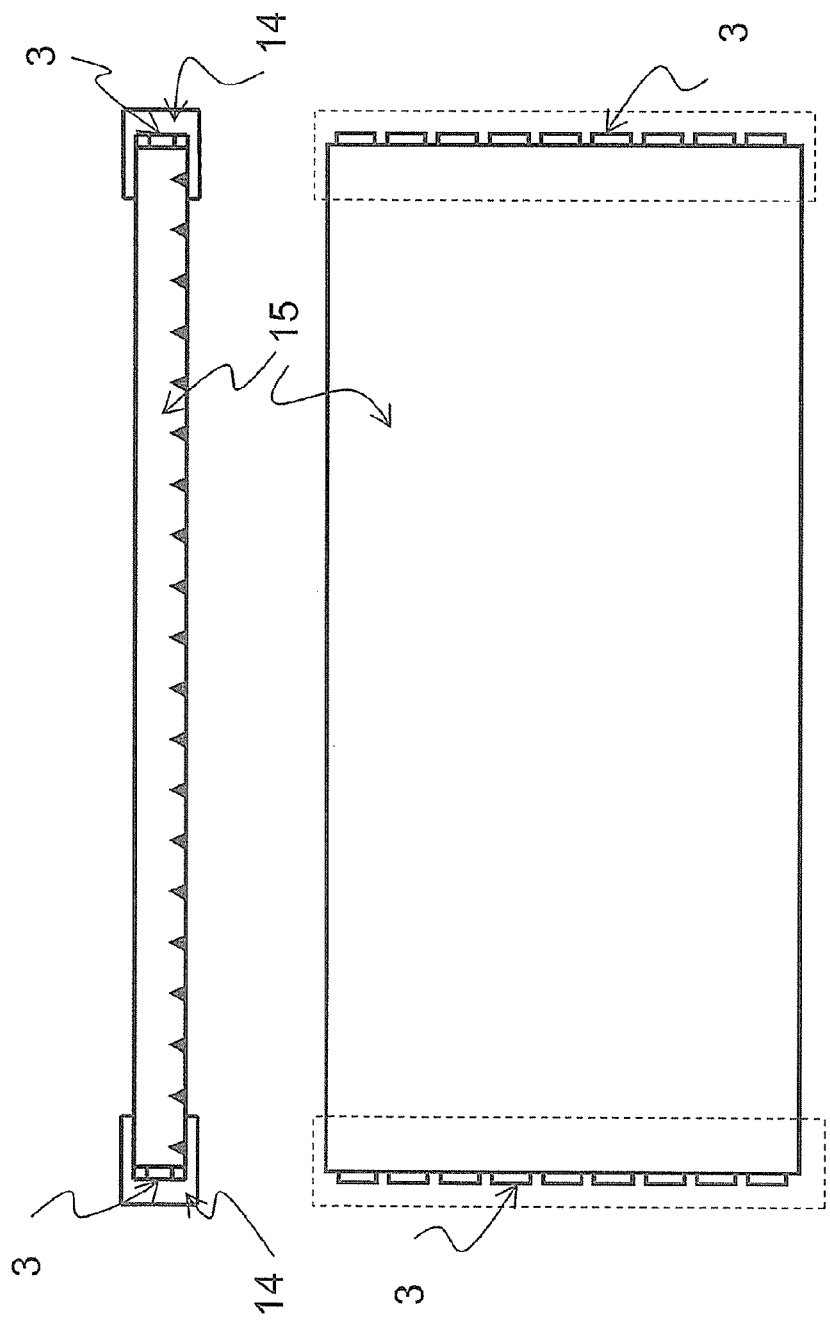
FIG. 11: a side view and a plan view schematically showing an embodiment of the optical shutter or planar light-source device using the light guide related to the present invention, in which two opposing side-edge surfaces are set as light incidence surfaces.

As shown in FIG. 11, facing each of two opposing side-edge surfaces of optical shutter test piece 15, 14 pieces of LED light sources 3 (brand name: NS2W123B, made by Nichia Corporation) were placed at intervals of 14 mm. Then, LED light sources 3 were covered with cover 14 to obtain an optical shutter.

The transparency of the optical shutter was excellent when the shutter was open (LED light sources were off), and concealment capability (A) (concealment capability when seen diagonally) and concealment capability (B) (concealment capability when seen from the front) were both excellent when the shutter was closed (LED light sources were on). The results are shown in Table 3.

TABLE 1

|  | | | laser processing condition | | | | |
| --- | --- | --- | --- | --- | --- | --- | --- |
|  | type of light guide material | type of laser apparatus | type of condenser lens | laser scanning pitch (mm) | laser power (%) | laser scanning rate (%) | resolution (PPI) |
| example 1 | α | PLS4.75 | HPDFO | 1.00 | 55 | 50 | 500 |
| example 2 | α | PLS4.75 | HPDFO | 0.75 | 55 | 50 | 500 |
| example 3 | α | PLS4.75 | HPDFO | 0.50 | 50 | 50 | 500 |
| example 4 | α | PLS4.75 | HPDFO | 0.75 | 65 | 50 | 500 |
| example 5 | β | PLS4.75 | HPDFO | 1.00 | 55 | 50 | 500 |
| example 6 | β | PLS4.75 | HPDFO | 0.75 | 55 | 50 | 500 |

TABLE 1-continued

| | | | laser processing condition | | | | |
|---|---|---|---|---|---|---|---|
| | type of light guide material | type of laser apparatus | type of condenser lens | laser scanning pitch (mm) | laser power (%) | laser scanning rate (%) | resolution (PPI) |
| example 7 | β | PLS4.75 | HPDFO | 0.50 | 50 | 50 | 500 |
| example 8 | β | PLS4.75 | HPDFO | 0.75 | 65 | 50 | 500 |
| comp. example 1 | α | PLS4.75 | HPDFO | 0.25 | 40 | 50 | 500 |
| comp. example 2 | β | PLS4.75 | HPDFO | 0.25 | 40 | 50 | 500 |
| comp. example 3 | α | PLS4.75 | HPDFO | 1.25 | 55 | 50 | 500 |
| comp. example 4 | β | PLS4.75 | HPDFO | 1.25 | 55 | 50 | 500 |
| comp. example 5 | α | PLS4.75 | HPDFO | 0.75 | 80 | 50 | 500 |
| comp. example 6 | β | PLS4.75 | HPDFO | 0.75 | 80 | 50 | 500 |
| comp. example 7 | α | PLS4.75 | 1.5 in | 0.75 | 45 | 50 | 500 |
| comp. example 8 | β | PLS4.75 | 1.5 in | 0.75 | 45 | 50 | 500 |

Abbreviations in Table 1 are as follows.
HPDFO: condenser lens (brand name, made by Universal Laser Systems)
1.5 in: condenser lens (brand name, made by Universal Laser Systems)

TABLE 2

| | evaluation result of recess on main surface with light emitting mechanism | | |
|---|---|---|---|
| | depth (μm) | diameter (μm) | surface density (dot/(in)$^2$) |
| example 1 | 46 | 72 | 645 |
| example 2 | 48 | 71 | 1,147 |
| example 3 | 44 | 62 | 2,581 |
| example 4 | 61 | 90 | 1,147 |
| example 5 | 45 | 69 | 645 |
| example 6 | 49 | 66 | 1,147 |

TABLE 2-continued

| | evaluation result of recess on main surface with light emitting mechanism | | |
|---|---|---|---|
| | depth (μm) | diameter (μm) | surface density (dot/(in)$^2$) |
| example 7 | 42 | 62 | 2,581 |
| example 8 | 62 | 90 | 1,147 |
| comp. example 1 | 49 | 80 | 10,323 |
| comp. example 2 | 49 | 85 | 10,323 |
| comp. example 3 | 49 | 80 | 413 |
| comp. example 4 | 49 | 85 | 413 |
| comp. example 5 | 105 | 95 | 1,147 |
| comp. example 6 | 105 | 95 | 1,147 |
| comp. example 7 | 28 | 65 | 1,147 |
| comp. example 8 | 28 | 65 | 1,147 |
| comp. example 9 | 49 | 200 | 1,147 |
| comp. example 10 | 51 | 206 | 1,147 |

TABLE 3

| | evaluation of light guide test piece | | | evaluation result of optical shutter | | |
|---|---|---|---|---|---|---|
| | maximum emission angle (°) | haze value (%) | utilization efficiency of emitted light (%) | transparency | concealment (A) | concealment (B) |
| example 1 | 12 | 1.3 | 32.0 | ○ | ○ | ○ |
| example 2 | 13 | 1.4 | 17.6 | ○ | ○ | ○ |
| example 3 | 12 | 2.5 | 21.2 | ○ | ○ | ○ |
| example 4 | 13 | 1.8 | 19.1 | ○ | ○ | ○ |
| example 5 | 12 | 0.2 | 19.9 | ○ | ○ | ○ |
| example 6 | 11 | 0.8 | 24.6 | ○ | ○ | ○ |
| example 7 | 11 | 1.1 | 30.4 | ○ | ○ | ○ |
| example 8 | 11 | 1.9 | 26.3 | ○ | ○ | ○ |
| comp. example 1 | 13 | 5.1 | 31.0 | x | ○ | ○ |
| comp. example 2 | 15 | 4.2 | 30.5 | x | ○ | ○ |
| comp. example 3 | 12 | 0.5 | 13.1 | ○ | x | x |
| comp. example 4 | 13 | 0.5 | 14.0 | ○ | x | x |
| comp. example 5 | 15 | 4.8 | 20.3 | x | ○ | ○ |
| comp. example 6 | 14 | 4.3 | 30.3 | x | ○ | ○ |
| comp. example 7 | 64 | 1.1 | 14.5 | ○ | x | x |
| comp. example 8 | 65 | 1.1 | 13.9 | ○ | x | x |
| comp. example 9 | 55 | 6.4 | 19.1 | x | ○ | ○ |
| comp. example 10 | 55 | 10.5 | 26.3 | x | ○ | ○ |

Examples 2 to 8

Optical shutter test pieces, light guide test pieces and optical shutters were prepared the same as in Example 1 except that the types of the light guide materials and laser processing conditions were changed as shown in Table 1. The evaluation results are shown in Tables 2 and 3.

Comparative Examples 1 to 8

Optical shutter test pieces, light guide test pieces and optical shutters were prepared the same as in Example 1 except that the types of the light guide materials and laser processing conditions were changed as shown in Table 1. The evaluation results are shown in Tables 2 and 3.

In Comparative Example 1, the surface density of recesses was 10,323 dots per square inch and the haze value was high at 5.1%; transparency of the optical shutter was low.

In Comparative Example 2, the surface density of recesses was 10,323 dots per square inch and the haze value was high at 4.2%; transparency of the optical shutter was low.

In Comparative Example 3, the surface density of recesses was low at 413 dots/square inch and the utilization efficiency of emitted light was low at 13.1%; concealment capabilities (A) and (B) were insufficient.

In Comparative Example 4, the surface density of recesses was low at 413 dots/square inch and the utilization efficiency of emitted light was low at 14.0%; concealment capabilities (A) and (B) were insufficient.

In Comparative Example 5, the depth of recesses was deep at 105 μm and the haze value was high at 4.8%; transparency of the optical shutter was low.

In Comparative Example 6, the depth of recesses was deep at 105 μm and the haze value was high at 4.3%; transparency of the optical shutter was low.

In Comparative Example 7, since the depth of recesses was shallow at 28 μm, the utilization efficiency of emitted light was low at 14.5%, and the maximum emission angle was great at 64 degrees; concealment capabilities (A) and (B) were insufficient.

In Comparative Example 8, since the depth of recesses was shallow at 28 μm, the utilization efficiency of emitted light was low at 13.9%, and the maximum emission angle was great at 65 degrees; concealment capabilities (A) and (B) were insufficient.

Comparative Examples 9 and 10

Optical shutter test pieces and light guide test pieces were prepared the same as in Example 1 except that a $CO_2$ laser marker (ML-Z9525 (brand name), made by Keyence Corporation) was used instead of a $CO_2$ laser processing apparatus with a condenser lens, and laser processing conditions were changed as shown in Table 4. The evaluation results are shown in Tables 2 and 3.

TABLE 4

| type of light guide material | laser processing condition | | | |
|---|---|---|---|---|
| | type of laser apparatus | laser scanning pitch (mm) | laser power (%) | laser scanning rate (%) |
| comp. example 9 | α | ML-Z9525 | 0.75 | 70 | 500 |
| comp. example 10 | β | ML-Z9525 | 0.75 | 70 | 500 |

In Comparative Example 9, the diameter of recesses was large at 200 μm and the haze value was high at 6.4%, resulting in low transparency of the optical shutter.

In Comparative Example 10, the diameter of recesses was large at 206 μm and the haze value was high at 10.5%, resulting in low transparency of the optical shutter.

POTENTIAL INDUSTRIAL APPLICABILITY

The light guide related to the present invention can be used as an optical shutter and is suitable for use in windows of a building such as skylights and partitions.

Also, the light guide related to the present invention can be used as a planar light-source device and is suitable for use in lighting appliances such as ceiling lights.

What is claimed is:

1. A light guide formed in a plate shape, comprising:
light emitting surfaces set on two opposing main surfaces; and
a light incidence surface set on at least one side-edge surface,
wherein a light emitting mechanism is formed in at least one region of at least two main surfaces,
the haze value is 3% or lower in the region where the light emitting mechanism is formed;
when a perfect diffuse light enters through the at least one light incidence surface, a maximum emission angle from a region of one main surface with the light emission mechanism is in a range from −30 degrees to +30 degrees with respect to a normal line to the main surface, while the maximum emission angle from a region of the other main surface with the light emission mechanism is in a range from −60 degrees to −30 degrees; in a range from +30 degrees to +60 degrees; or in both of a range from −60 degrees to −30 degrees and another range from +30 degrees to +60 degrees; and
the utilization efficiency of emitted light is 15% or greater.

2. A light guide formed in a plate shape, comprising:
light emitting surfaces set on two opposing main surfaces; and
a light incidence surface set on at least one side-edge surface,
wherein in at least part of the region of at least two main surfaces, microscopic recesses or protrusions are formed as a light emitting mechanism,
the depth of the recess or the height of the protrusion is at least 30 μm but no greater than 70 μm,
a diameter of the recess or the protrusion is at least 40 μm but no greater than 150 μm, and
the surface density of recesses or protrusions per 1 square inch is at least 450 dots but no more than 5,000 dots, and
when a perfect diffuse light enters through the at least one light incidence surface, a maximum emission angle from a region of one main surface with the light emission mechanism is in a range from −30 degrees to +30 degrees with respect to a normal line to the main surface, while the maximum emission angle from a region of the other main surface with the light emission mechanism is in a range from −60 degrees to −30 degrees; in a range from +30 degrees to +60 degrees; or in both of a range from −60 degrees to −30 degrees and another range from +30 degrees to +60 degrees.

3. A manufacturing method of the light guide according to claim 2, wherein the light emitting mechanism is formed by irradiating laser beams on at least part of the region of at least one main surface of a light guide material.

4. An optical shutter, wherein a light source is placed to face the light incidence surface in the light guide according to claim 2.

5. A planar light-source device, wherein a light source is placed to face the light incidence surface of the light guide according to claim 2.

* * * * *